United States Patent [19]

Goshima et al.

[11] 4,003,636

[45] Jan. 18, 1977

[54] LINEAR IMAGE FORMING APPARATUS

[75] Inventors: Takeshi Goshima, Tokyo; Kiyonobu Endo, Yokohama, both of Japan

[73] Assignee: Canon Kabushiki Kaisha, Tokyo, Japan

[22] Filed: Dec. 12, 1974

[21] Appl. No.: 531,877

[30] Foreign Application Priority Data

Dec. 19, 1973  Japan .............................. 48-143212

[52] U.S. Cl. ............................ 350/162 R; 350/205
[51] Int. Cl.² ........................................ G02B 5/18
[58] Field of Search ...................... 350/205, 162 R; 356/106 R, 111

[56] References Cited

UNITED STATES PATENTS

| | | | |
|---|---|---|---|
| 3,145,252 | 8/1964 | Herriott | 356/111 X |
| 3,216,318 | 11/1965 | Gaffard | 356/106 R X |
| 3,232,165 | 2/1966 | Dupuy et al. | 356/111 |

*Primary Examiner*—John K. Corbin
*Assistant Examiner*—B. Wm. de los Reyes
*Attorney, Agent, or Firm*—Fitzpatrick, Cella, Harper & Scinto

[57] ABSTRACT

The present invention relates to a linear image forming apparatus. Said apparatus includes a beam generator for generating a light beam, a filter provided with a plurality of slits to irradiate the light beam from said beam generator to pass it therethrough in a rectangular form, whose width determines the length of the linear image formed by the beam which has passed through said slit, and a converging optical system for irradiating the beam passed through the plural slits of said filter and converge the irradiated beam for making one linear image.

3 Claims, 12 Drawing Figures

PRIOR ART

LINEAR IMAGE FORMING APPARATUS

BACKGROUND OF THE INVENTION

1. Field of the Invention

This invention relates to a linear image forming apparatus which forms an image in linear form and more particularly, to a linear image forming apparatus which makes a linear image with less uneven distribution of evergy strength.

2. Description of the Prior Art

In the prior art, there was an apparatus in which a cylindrical lens was inserted in the parallel light beam, and a condenser lens was placed at the backside of the cylindrical lens to obtain a linear image pattern on the focal plane thereof for forming the final linear image. In other words, in FIGS. 1A and 1B of the accompanying drawing, the parallel light beam 11 with cylindrical cross section is dispersed only in the direction of Y by means of the cylindrical lens 12 with negative refractivity, for example, to reach the condenser lens 13. On the other hand, the constituent in the direction of X of the beam receives no dispersion at the lens 13 and thus, it is condensed on the focal plane (F) of the lens 13. However, since the constituent in the direction Y has been dispersed with the lens 12, it is not condensed on the plane (F), but on the composite focal plane F' of the cylindrical lens 12 and the condenser lens 13. As a result, the linear images 14 and 15 are formed extending in either the X or Y direction on the planes F and F'. This optical system can be said to be one with astigmatism, because the focal plane is different for the light beam of the directions X and Y. In short, the light beam is focalized on the plane F concerning the direction X, but not for the direction Y.

As known in the prior art, when the parallel light beam is condensed on a spot by means of a condenser lens, a circular distribution of light called Airy Disk is produced on the focal plane of the lens. The diametrical cross section having such a distribution of a light beam is indicated by the primary Bessel function and shown in FIG. 2A, where the abscissa represents the beam length and the ordinate the beam strength. As is also well known, the zero dimension diameter of the Airy Disk (double distance of the first strength falling to zero from the center) is given in the formula;

$$l = 1.22 \, (\lambda/N.A.)$$

Where the $\tau$ is the waveform of light and N.A. the aperture number of the lens. If the focal distance is represented by "$f$" and the diameter "D", the following equation is given:

$$N.A. = (D/2f);$$

It is seen that various types of light distribution are obtained, accordingly, by changing the aperture number of each light beam direction. Therefore, it is recommended to use a rectangular condenser lens with a different N.A. or an optics with an ordinary circular aperture lens fitted by a mask having a rectangular aperture for obtaining a linear image based on the above principle. In this way, the distribution of the light indicated by the formula $(\sin (kax)/kax^2$ is obtained on the focal plane of the lens used. In this formula, $2a$ is the aperture diameter, $k = (2\pi/\tau P)$ and $f =$ the focal distance of lens. Thus, the distribution of light will be as shown in FIG. 2B, providing the image in a linear form as shown by the oblique line area. For example, if the N.A. of the direction X is 0.95 and the N.A. of the direction Y 0.10, by using a light beam with a wavelength of 4500A, the zero dimension diameter of each direction is given by the equations:

$$lx = (0.45/0.95) = 0.47 \, \mu, \, ly = (0.45/0.10) = 4.5 \, \mu$$

As a result, the distribution of light is obtained in the width of 0.47 $\mu$ and the length of 4.5 $\mu$.

However, in this way, the provision of a filter is required to make one of the cross sections of the beam from a beam generator source in a rectangular shape, and thus, only the small portion of the beam generated from the source is used for the linear image formation, resulting in inefficient beam utilization.

SUMMARY OF THE INVENTION

The present invention eliminates the above mentioned conventional defect.

Thus, an object of the invention is to provide a linear image forming apparatus to obtain a linear image with less uneveness of light beam strength.

It is another object of the invention to provide a linear image forming apparatus with minimized beam energy loss.

It is a further object of the invention to provide a linear image forming apparatus with the simplest construction.

The other objects and advantages of the invention will become apparent from the following detailed description considered together with the accompanying drawings, in which:

DESCRIPTION OF THE PREFERRED EMBODIMENT

The invention achieves the above mentioned object in a manner in which a filter with a plurality of rectangular openings having shorter and longer sides is inserted in the path of the beam generated from a beam source, and the light beam passed through the filter is condensed with a condenser lens, thereby forming a linear image with the length determined by the shorter side with the narrowest width from among the shorter sides of said plural openings.

Figure 3A:
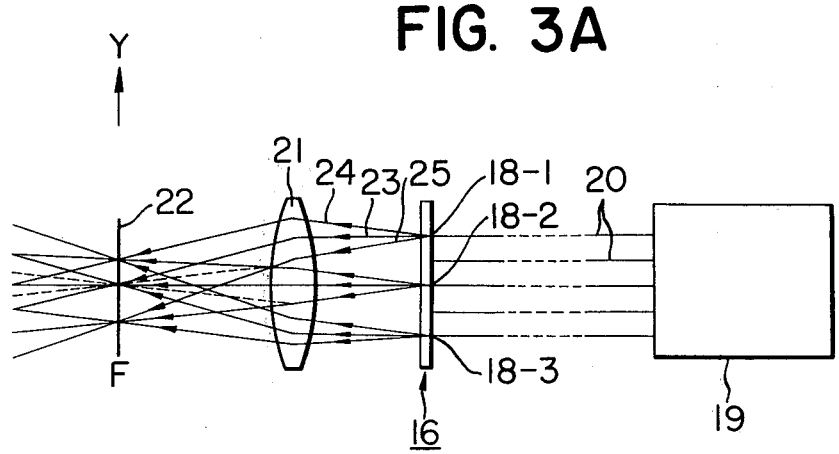
FIGS. 3A and B are, respectively, schematic diagrams explaining a linear image forming apparatus according to the invention, and a front view of a filter, respectively.

Now, one embodiment of the invention is described with reference to the drawings. In FIG. 3A, the reference number 16 is a filter, which comprises a light shielding plate made by a metal plate, for example, and indicated by the oblique lines, and a plurality of parallel arranged openings 18 (18-1, 18-2 18n) of 2a width and 2d length provided by cutting said shielding plate to permit the light to pass therethrough. The openings are disposed with a space S (S1, S2 Sn) which is different for each opening. In FIG. 3A, however, the filter taking the space S is shown constant. The width 2a of each opening of the filter 16 is a factor for determining the length of a linear image in the formation thereof, which will be described later. Each space S also becomes a factor for the determination of the energy distribution in the linear image obtained.

Figure 3B:
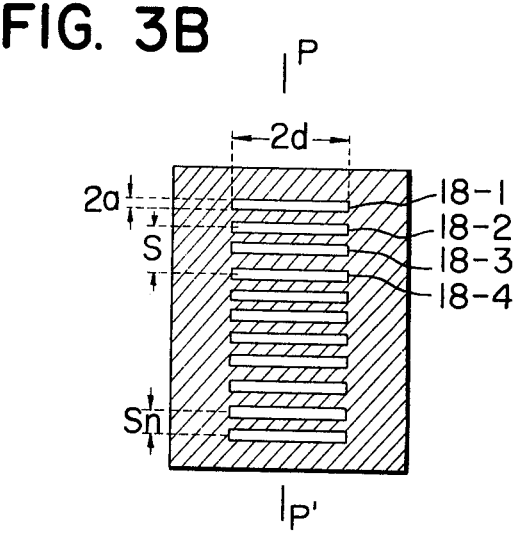
FIG. 3C is a graph indicating the distribution of light for the illustrative purpose of the invention.

FIG. 3A shows a linear image forming apparatus according to the invention. Here, the parallel light beam 20 obtained from the laser generator 19, is irradiated to the filter 16 (In FIG. 3A, this filter is shown as the cross section P—P' in FIG. 3B, and only three of the openings 18-1, 18-2 and 18-3 are shown for the purpose of simplifying the illustration.), and the light beam passed through the filter 16 is condensed by the condenser lens 21 whereby a clear linear image with strong energy can be obtained on the focal plane 22.

Further, the invention is described in detail with reference to FIG. 3A. When the parallel light beam 20 is passed through the filter 16, it is partially expanded by diffracting at the slit openings 18-1~18-3 provided on said filter. Now among these light beams which have passed through the slit opeing 18-1, the light beam 23 received no effect of the diffraction and the light beams 24 and 25 were curved by the diffraction. These three light beams are crossed on the focal plane 22 of the condenser lens 21 with different heights in the direction Y, because the angular constituents of each light beam differs on the plane 22. The same process is taken for the light beams from the slit openings 18-2 and 18-3, however, the light beams having an equal angular constituent are collected at one point on the focal plane 22. Thereafter, these light beams will independently diverge to advance, and never be condensed rearward of the focal plane. The light beam of the direction (indicated by the broken line) X vertical to the paper surface is also condensed on the focal plane, and then diverged to advance. Thus, the condensing plane is only the plane 22 for both of the light beam constituents of the directions X and Y. The distribution of the light in the direction Y obtained in this way on the focal plane 22 is given in the formula (1):

$$IY = C^2 + S^2 \qquad (1)$$

However, $$C = \int_p \int_{s-a}^{s+a} \cos(kY\epsilon) d\epsilon ds$$

$$S = \int_p 0 \int_{s-a}^{s+a} \sin(kY\epsilon) d\epsilon ds \qquad k = \frac{2\pi}{\lambda f}$$

When the formula (1) is calculated, the following formula (2) is obtained.

$$IY = 4a^2 \left[\frac{\sin(kaY)}{kaY}\right]^2 \left[(\int_p \cos(ksY)ds) + (\int_p \sin(ksY)ds)^2\right] \qquad (2)$$

In this formula, the "s" represents the distance from the center of one opening to the center of the other opening and the "p" indicates the existing range of "s". If the slit opening is sufficiently contained in the filter, the integral term in the formula (2) is considered constant, and the distribution of light is at least given in the formula (3):

$$IY \approx \left[\frac{\sin(kaY)}{kaY}\right]^2 \qquad (3)$$

The diameter at the zero dimension is obtained by the equations below according to the formulas (3) and (4).

$$lx = \frac{\lambda}{d}f \qquad NAx = \frac{f}{d}$$

$$lx = \frac{\lambda}{d}f \qquad NAy = \frac{f}{d}$$

Figure 1A:
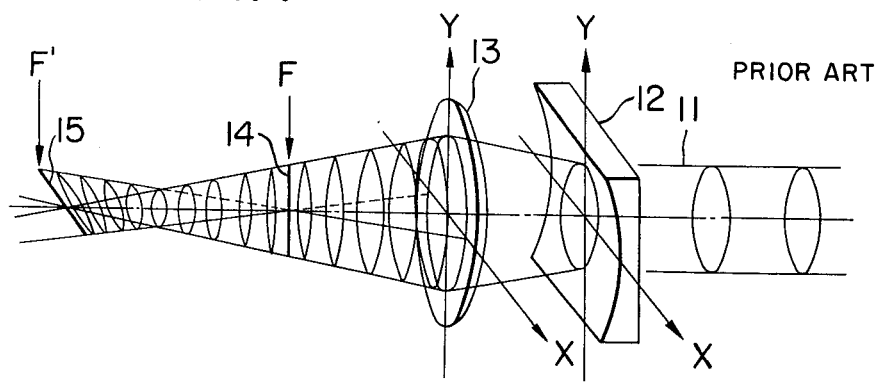
FIGS. 1A and 1B are descriptive diagrams of a conventional linear image forming apparatus.
Figure 1B:
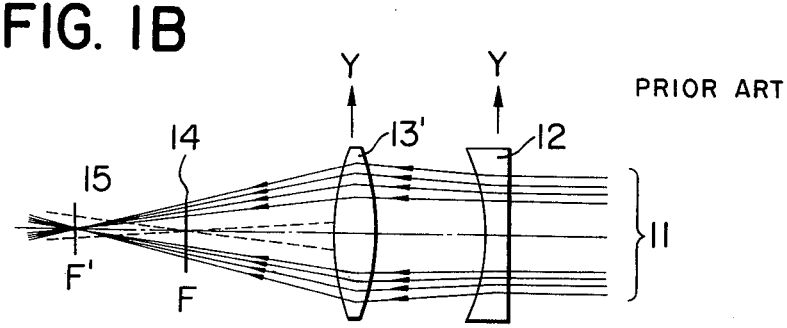
Figure 2A:
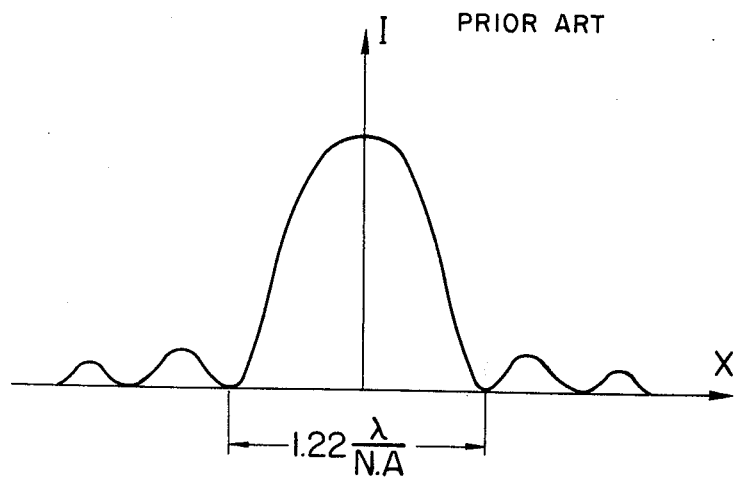
FIG. 2A is a graph indicating the distribution of light at the beam spot focussed by a converging lens.

That is, the use of the above mentioned filter provides the same effect as obtained when a rectangular condenser lens with different NA for the directions X and Y, and the linear distribution of light as shown in FIG. 2A. In other words, a filter with plural openings can offer the linear image having the same distribution of light as made through a filter with one opening. It is seen that when the opening width 2a of the slit of said filter is altered, the same effect as above will also be obtained. The distribution of light at this time is obtained just by integrating the formula (3) for the direction Y as follows:

$$IY \approx \left[\int A \frac{\sin kaY}{kaY} da\right]^2 \qquad (5)$$

Figure 3C:
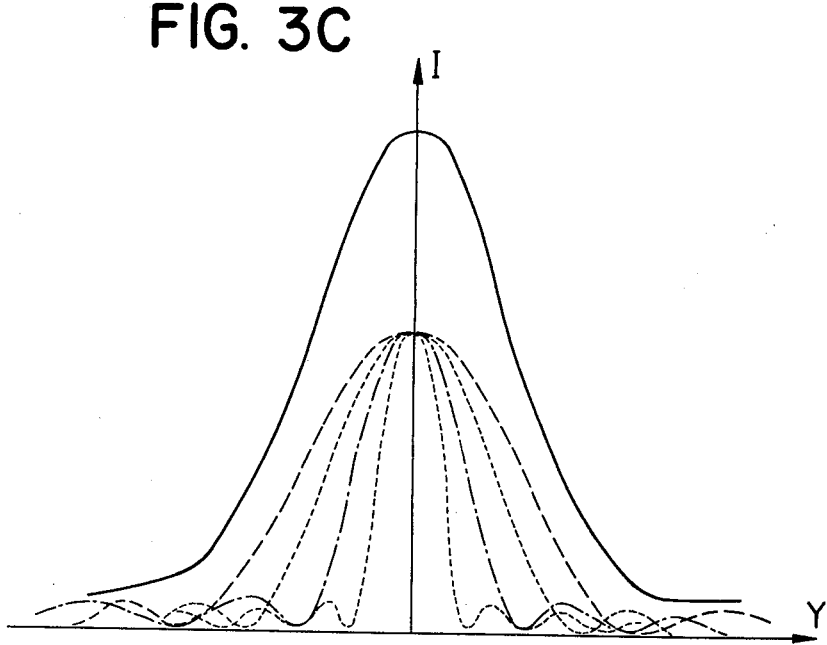

In this formula (5), "A" represents the available range of the slit opening width. The configuration of the distribution of light obtained by the formular (5) is shown in FIG. 3C.

Figure 2B:
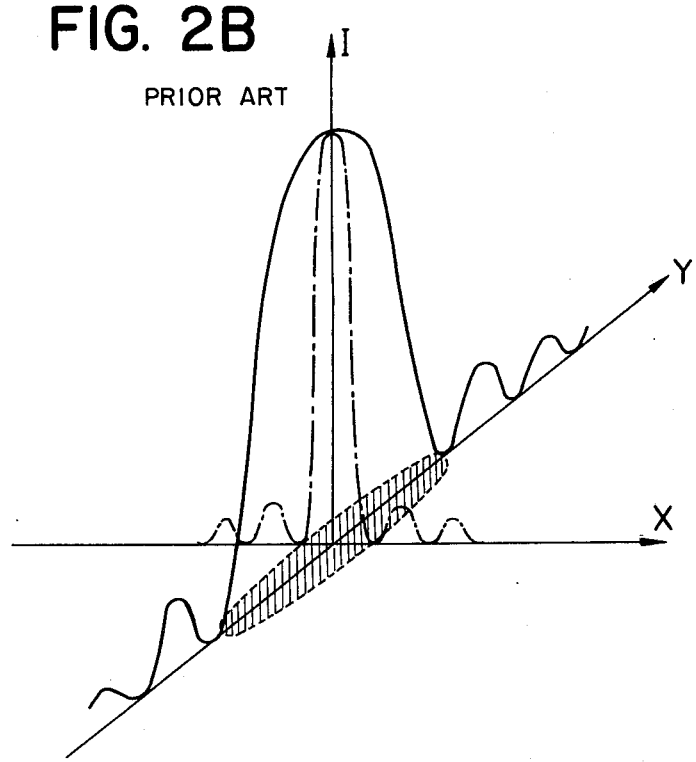
FIG. 2B is a graph indicating the distribution of the light beam focused by a rectangular converging lens.

The strength distribution indicated by the formula (5) is considered as the superposition of the distribution of light through each slit opening. The graph, indicated by the broken line in FIG. 3C, is the distribution of light obtained through each slit opening, which is the distribution given in the formula (5) and made by the superposition of the solid line graphs, shown smaller than the actual ones for the reasons of space factor. As presumable from the graph, the expanse is decided by the slit opening to give the maximum expanse (in this case, the one with the minimum width among the slit openings contained in the filter). The distribution of light in the direction X is quite the same as the one of the formula (4) at this time. That is, the use of said filter provides the same effect as is obtained by the use of a rectangular condenser lens with different N.A. for the directions X and Y, and the distribution of light as shown in FIG. 2B can be obtained.

Figure 4:
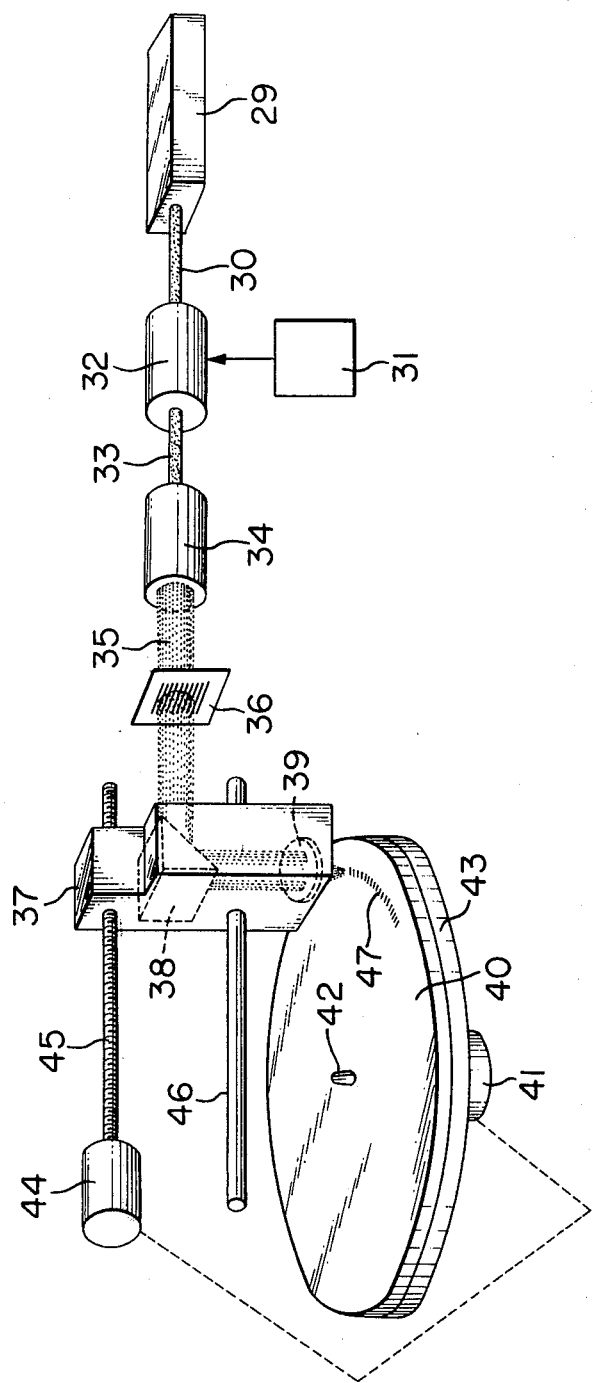
FIG. 4 and FIG. 5A are schematic diagrams of a linear image forming apparatus embodying the invention.

As described hereinbefore, a clear linear image is always obtained according to the invention. The application of such linear image forming apparatus to a linear image recording apparatus is described in detail. In FIG. 4, the reference number 29 indicates a high luminance light source comprising a laser generator. The beam 30 emitted from this laser geneator 26 is impressed on the optical modulator 32, to which a recording signal is impressed from the modulation signal source 31, and subjected to the dark and bright modulations with this recording signal by means of the optical modulator 31. The modulation beam 33 modulated by the recording signal in this way is further impressed on the beam expander 34 to expand the beam width for obtaining a thick beam 35. Such a beam 35 is passed through the filter 36 like the forementioned one and irradiated on the mirror 38 fixed on the movable base 37 to change the direction downward, and thereafter, irradiated to the converging lens 39 fixed also on said movable base 37 to be converged therethrough to record a linear image on the recording medium 40. In other words, the lense 39 and the recording medium 40 are disposed with the space therebetween equivalent to the focal distance of the lens 39. The recording medium 40 is shaped like a disk and made by photosensitive material in its plane to receive the irradiation of said beam 35. The medium can be rotated by the motor drive when it is mounted on the turntable 43 fixed to the rotary shaft of a motor 41. Said movable base 37 is provided with the tapped hole (not shown) engageable with the feed screw fixed to the rotary shaft of the motor 44. The feed screw 45 is engaged in this hole so that the base 37 is made movable in the radial direction of the recording medium 40 by the driving of the motor 41. The movable base 37 is provided with a guide hole (not shown) in which slidably fits the guide rod 46 arranged in parallel to said feed screw 45. By the fitting of the guide rod 46 in the guide hole, the movement of the base 37 with the feed screw 45 is assured. The laser generator 29, optical modulator 32, beam expander 34, filter 36, motor 44, ends of guide rod 46 and motor 41 are also fixed on the base. In this construction, the motors 41 and 44 are relatively driven and the beam 30 is ON-OFF modulated with the optical modulator 32, whereby the linear image 47 is disposed on the spiral line track of the recording medium 40 in the radial direction, with the spacing corresponding to the modulation. The linear image 47 formed on the recording medium 40 in this way is an image, free from being out-of-focus.

Figure 5A:
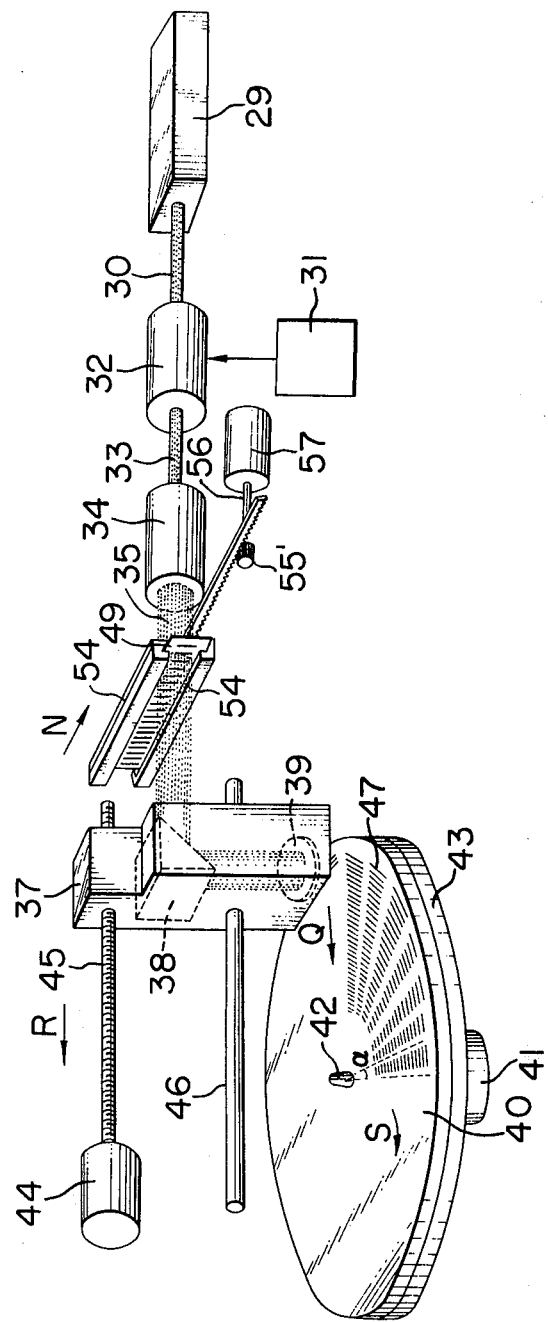
Figure 5B:
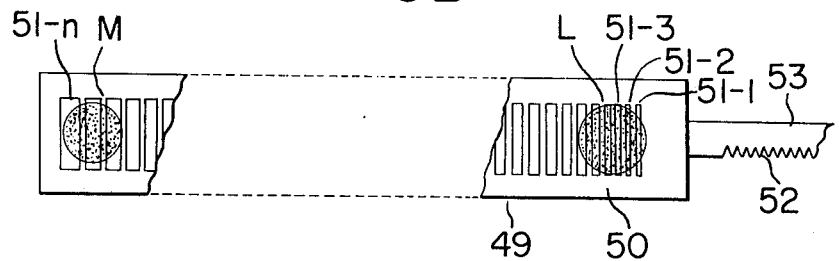
FIGS. 5B and 5C are enlarged diagrams of FIG. 5A.

Referring to FIG. 5, there is shown a linear image recording apparatus, in which the linear image forming apparatus of the invention has been applied. The members designated by the same reference numerals as in FIG. 4 exactly correspond thereto, as well as having the same function and effect as those in FIG. 4. However, the motors 41 and 44 are not driven in the correlative manner as previously described with reference to FIG. 4. The motor 41 consists of a pulse motor, for example, and while it is stopped, the motor 44 is driven to shift the movable base 37 in the direction of the arrow mark Q toward the inside of the radius. After the base reaches the predetermined position, the beam radiation from the beam generator 29 is inhibited and the motor 44 is inversely rotated to shift the base 37 to the illustrated position, and the motor 41 is driven to an extent corresponding to the angle $\alpha$. When such motor operation is completed, the motor 44 is once more driven to shift the base 37 in the arrow mark R direction as well as to operate the beam generator 29. As for the filter 49, the slits 51 with different widths are arranged on a long and narrow width metal plate 50 made of a non-transmissive member as shown in FIG. 5B in the sequence of from the narrower to the larger widths (generally indicated by 51-1, 51-2, 51-n), and the feed member 53 with the rack 52 is fixed to the end of plate member 50 having the narrower slits. The metal plate 50 is slidably fixed at its upper and lower ends to the holder member 54, which is fixed to said illustrated base, while the teeth 55, are fixed to the rotary shaft 56 of the motor 57 so as to engage with the rack 52, thereby the motor 57 is fixed to the base. As above described, in the linear image recording apparatus shown in FIG. 5A, the surface of the recording member 40 and the lengthwise direction of the slit 50 are at right angles and thus, the linear image 47 is formed on the recording medium 40 so as to be rectangular to the radial direction. With the filter 50 disposed in this way, the base 37 can be shifted by the motor 44 from the condition when the beam 35 is irradiated on the filter, as indicated by the dotted circle L in FIG. 5B, to the condition where the beam 35 is irradiated on the filter, as indicated by the dotted circle M. Therefore, the motor 57 is operated in synchronism with the motor 44 so that the beam 35 may be located at the position L in FIG. 5B when the movable base 37 is positioned at the outermost end of the radius to be recorded as shown in FIG. 5A, and also may be located at the position M in FIG. 5B when the base is positioned at the innermost end thereof to thereby shift both the movable base 37 and the filter 49 in the direction of the arrows R and N. Further when the motor 44 is inversely rotated to drive the movable base in the counter-direction to the arrow R for returning the base to its initial condition, the motor 57 is also inversely rotated in synchronism therewith to drive the filter 49 in the counter-direction to the arrow N for returning the filter 49 to its initial condition. In short, in the linear image forming apparatus shown in FIG. 5A, the conditions where the beam 35 is irradiated on the filter 49 as indicated by "L" and where the linear image developed by means of the movable base 37 is positioned at the outermost end of the recording medium as shown in FIG. 5A are taken as an initial condition for the irradiation of the beam 30 from the beam generator 29, and, at the same time, the beam 30 is modulated by the optical modulator 32, and the motors 44 and 57 are simultaneously operated while the motor 41 is stopped so as to shift the movable base 37 and the filter 50 in the direction of the arrow marks R and N, respectively. Thus, when the filter 49 is shifted to the position where it is irradiated by the beam 35 as shown by "M" and the movable base 37 moves to the innermost end of the radius to be recorded (the motors 44 and 57 are so driven that, when the movable base 37 arrives at the innermost end of the radius to be recorded, the filter 49 may simultaneously arrive at the position M) the laser generator 29 is stopped or the light modulator 32 is controlled to intercept the beam 33, simultaneously causing the motors 44 and 57 to inversely rotate to shift the base 37 and filter 49 in the counter-direction to the arrows R and N, respectively. In this consequence the motor 41 is driven in the direction of the arrow mark S for to the extent corresponding to the angle $\alpha$ and then stopped. When the base 37 and the filter 49 are thus set in their respective initial conditions, the same procedures as mentiond above are repeated. By such control, a linear image can be produced on the recording medium 40 at every angle α in the direction perpendicular to the radium of the medium 40.

Figure 5C:
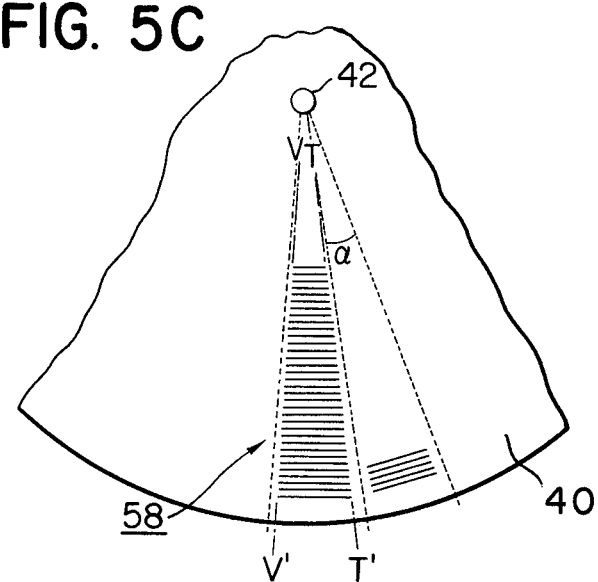
Figure 6:
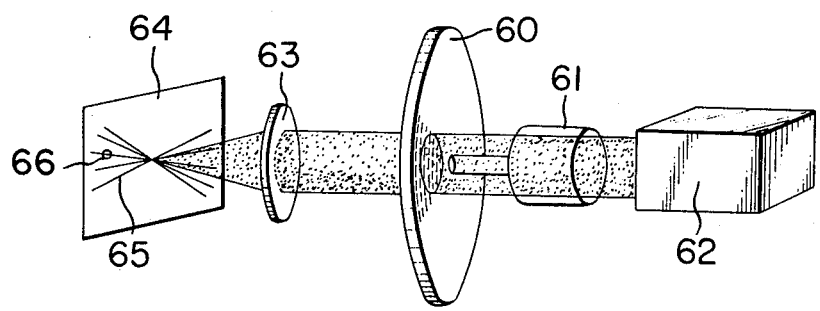
FIG. 6 is a schematic perspective view of one application of a recording medium according to the invention, through which a linear image is formed.

The length of the linear image passed through the slit as described above is the function of the slit width and is proportional to the slit width, i.e., the narrrower the slit is, the longer becomes the length of the linear image, and vice versa. Thus, the width of the slit 51 can be so selected that the end parts of a group of slits recorded in certain radial directions may be positioned on the radius T-T' and V-V' as shown in FIG. 5C. The linear image recording apparatus as shown in FIGS. 4 and 5 will produce effective results when used as a video disk recorder which records the television signal. If the linear image recording apparatus shown in FIG. 4 is used to record a linear image in a manner such as by concentrically dividing the circumference, it is possible to manufacture a rotary encoder for use in detecting the motor rotation with high precision. Moreover, as shown in FIG. 5, by effecting vertical recording in the radial direction of the disk, a novel system of rotary encoder will also become producible. That is, in FIG. 5, the recording medium 40 is constructed in such a manner that only the portion where the linear image is formed is made light transmissive, while the other portion intercepts the light, thereby producing the disk 60 shown in FIG. 6. Thereafter the medium 40 is fixed to motor 61 to detect the rotary condition thereof, and then the laser from the laser generator 62 is caused to transmit through the whole medium or part of it. When the distribution of light or the focal plane 64 of the lens 63 is observed in this construction, it is found that the spectrum of the group of linear images contained in the disk 60 formed as the luminous line 65 rotates in the direction vertical to the direction of the group of linear images. If the optical detector 66 is placed on the plane and the time required for the luminous line 65 to pass through the light detector 66 is measured, the rotational movement of the motor 61 will become evident. The advantage of such encorder is that as the luminous line 65 is insensitive to lateral vibration, but rotatable to the rotational movement to traverse the optical detector 66, no precision is required in indexing the positions of the shaft of the motor to be detected and the center of the disk 60, because the direction of the luminous line 65 is determined only by the direction of the group of lines contained in the disk 60.

We claim:
1. A linear image forming apparatus, comprising in combination:
   a beam generator to generate a light beam;
   a filter provided with a plurality of rectangular slits for diffracting said light beam from said beam generator thereby providing partial expansion thereof, said slits being arranged in parallel to each other to permit the light beam from said beam generator to pass therethrough in rectangular form, the width of each said slit being made different from the others, and the space interval between the adjacent slits also being different; and
   a converging lens to irradiate the beam passed through said plurality of slits in said filter and to converge the irradiated beam, thereby forming a linear image on the focal plane of the lens.
2. An apparatus of claim 1, wherein said beam generator comprises a laser generator.
3. An apparatus of claim 1, wherein said filter is made of a light intercepting material having in one part thereof a light transmitting slit.

* * * * *

UNITED STATES PATENT AND TRADEMARK OFFICE
CERTIFICATE OF CORRECTION

PATENT NO. : 4,003,636
DATED : January 18, 1977
INVENTOR(S) : TAKESHI GOSHIMA and KIYONOBU ENDO It is certified that error appears in the above-identified patent and that said Letters Patent are hereby corrected as shown below:

Column 1, Line 63  Change "$(\sin(kax)/kax^2)$" to read --$(\sin(kax)/kax)^2$--

Column 1, Line 65  Change "$k=(2\pi/\tau P)$" to read -- $k=2\pi/\lambda f$ --.

Column 2, Line 5  Change "$\mu$", both occurrences, to read --$\mu m$--;

Column 2, Line 8  Change "$\mu$", both occurrences, to read --$\mu m$--;

Column 3, Lines 51-59  insert "$\int$" before and after each symbol "$p$", and delete "0";

Column 3, Line 69  insert --$\int$-- before each symbol "$p$";

Column 4, Line 38  insert "$\int$" before "A"

Column 7, Line 3  Change "radium" to read --radius--

Signed and Sealed this

Seventeenth Day of May 1977

[SEAL]

Attest:

RUTH C. MASON
*Attesting Officer*

C. MARSHALL DANN
*Commissioner of Patents and Trademarks*